United States Patent [19]
Howell et al.

[11] Patent Number: 5,825,616
[45] Date of Patent: Oct. 20, 1998

[54] MEDIA MODULE LOCKING AND EJECTING MECHANISM

[75] Inventors: Bryan F. Howell; John P. Busch, both of Austin, Tex.; Kenneth R. Haven; Tim O. Lau, both of Fremont, Calif.

[73] Assignee: Dell USA, L.P., Round Rock, Tex.

[21] Appl. No.: 784,568

[22] Filed: Jan. 21, 1997

[51] Int. Cl.⁶ .............................. G06F 1/16; G11B 33/02; H05K 7/10; H01R 13/62
[52] U.S. Cl. .......................... 361/684; 361/685; 361/726; 439/155
[58] Field of Search .................... 439/152, 155, 439/159, 160, 353, 347, 377, 928.1, 374; 364/708.1; 312/332.1, 333, 319.1; 361/684, 685, 725–727, 740, 753, 747, 754, 798

[56] References Cited

U.S. PATENT DOCUMENTS

| | | | |
|---|---|---|---|
| 4,887,188 | 12/1989 | Yoshida | 361/684 |
| 5,220,520 | 6/1993 | Kessoku | 364/708.1 |
| 5,305,180 | 4/1994 | Mitchell et al. | 361/685 |
| 5,319,519 | 6/1994 | Sheppard et al. | 361/685 |
| 5,386,407 | 1/1995 | Park | 369/77.2 |
| 5,422,785 | 6/1995 | Garrett et al. | 361/684 |
| 5,440,448 | 8/1995 | Stewart et al. | 361/684 |
| 5,507,658 | 4/1996 | Ho | 439/159 |
| 5,558,527 | 9/1996 | Lin | 439/155 |
| 5,587,854 | 12/1996 | Sato et al. | 360/97.01 |

FOREIGN PATENT DOCUMENTS 0 310 273 B1   9/1988   European Pat. Off. .

*Primary Examiner*—Michael W. Phillips
*Attorney, Agent, or Firm*—Skjerven, Morrill Macpherson, Franklin & Friel, L.L.P.; Stephen A. Terrile

[57] ABSTRACT

An apparatus for locking and ejecting a media module in a media bay includes a locking device engaging the media module to lock the media module in a locked position in the media bay, a rod engaging the locking device to disengage the locking device from the media module, a rotating body mounted on a pivot, the pivot physically coupled to the media bay, and a first spring, the first spring generating a force against the rotating body, the force against the rotating body rotating the rotating body on disengagement of the locking device from the media module, the rotation of the rotating body ejecting the media module from the locked position.

43 Claims, 9 Drawing Sheets

FIG. 3 (Top View)

FIG. 4 (Top View)

MEDIA MODULE LOCKING AND EJECTING MECHANISM

RELATED REFERENCE

The present application is related to pending U.S. patent application Ser. No. 08/663,830, entitled "Media Eject Mechanism", which is incorporated herein in its entirety.

BACKGROUND OF THE INVENTION

1. Field of the Invention

The present invention relates generally to computer system, and more particularly, to a media module locking and ejecting mechanism and method for a computer system.

2. Description of the Related Art

Personal computer systems in general and IBM compatible personal computer systems in particular have attained widespread use. These personal computer systems now provide computing power to many segments of today's modern society. A personal computer system can usually be defined as a desktop, floor-standing, or portable computer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect the devices and components of the system unit. A personal computer system typically includes one or a more I/O devices, also called peripheral devices, which are connected to the system processor and perform specialized functions. Examples of I/O devices include modems, sound and video devices or specialized communication devices. Mass storage devices such as hard disks drives, CD-ROM drives, and magneto-optical drives are also considered to be I/O or peripheral devices.

Personal computer systems with connected I/O and peripheral devices are information handling systems, designed primarily to give independent computing power to a single user or group of users. Personal computer systems are often inexpensively priced for purchase by individuals or small businesses.

Portable computers are commonly called laptop, notebook or subnotebook computers. Portable computers typically incorporate a flat panel display such as a liquid crystal display (LCD) or other relatively small display.

As portable computers have increased in sophistication and decreased in size, efforts have been made to increase the amount of internally-stored data and the number of peripheral devices contained within the portable computer despite a loss in internal physical capacity resulting from the decreased size. One technique for more space-efficiently containing I/O and peripheral devices is to supply a media bay within the portable computer. The media bay flexibly holds one or more removable electronic devices or media modules such as a CD ROM drive, a floppy disk drive, a set of speakers, or extra battery pack, etc. The modules are easily installed for usage by the portable computer system, and then easily removed, allowing for connection of other electronic modules.

Several problems arise with the existing removable media module systems in portable computers. One problem is that space in a portable computer is at a premium so little space is available for the mechanical latching mechanisms ordinarily used to retain a media module in a media bay. As a result of space constraints, the latching mechanism for locking the media module in place within the portable computer during use is often unreliable and the ejection mechanism typically does not operate efficiently for easy removal of a media module. In addition to mechanical constraints, portable computers operate on batteries with limited power and capacity. Consequently, traditional power operated latching and ejection mechanisms are not suitable for the portable computer environment.

What is needed is a media module locking and ejecting mechanism providing reliable latching and easy removal of the media module. What is further needed is a media module locking and ejecting mechanism with only a small number of discrete parts that is both simple and compact.

SUMMARY OF THE INVENTION

In accordance with the present invention, an apparatus for locking and ejecting a media module in a media bay includes a locking device engaging the media module to lock the media module in a locked position in the media bay, a rod engaging the locking device to disengage the locking device from the media module, a rotating body mounted on a pivot, the pivot physically coupled to the media bay, and a first spring, the first spring generating a force against the rotating body, the force against the rotating body rotating the rotating body on disengagement of the locking device from the media module, the rotation of the rotating body ejecting the media module from the locked position.

Generating a force by a first spring against a rotating body to rotate the rotating body, where the rotation of the rotating body ejecting the media module from the locked position advantageously provides a media module locking an ejecting mechanism that is simple and compact. Providing the rotating force with a spring simplifies, localizes, and reduces the size of the media module ejection mechanism.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

The following sets forth a detailed description of the best contemplated mode for carrying out the invention. The description is intended to be illustrative of the invention and should not be taken to be limiting.

Figure 1:
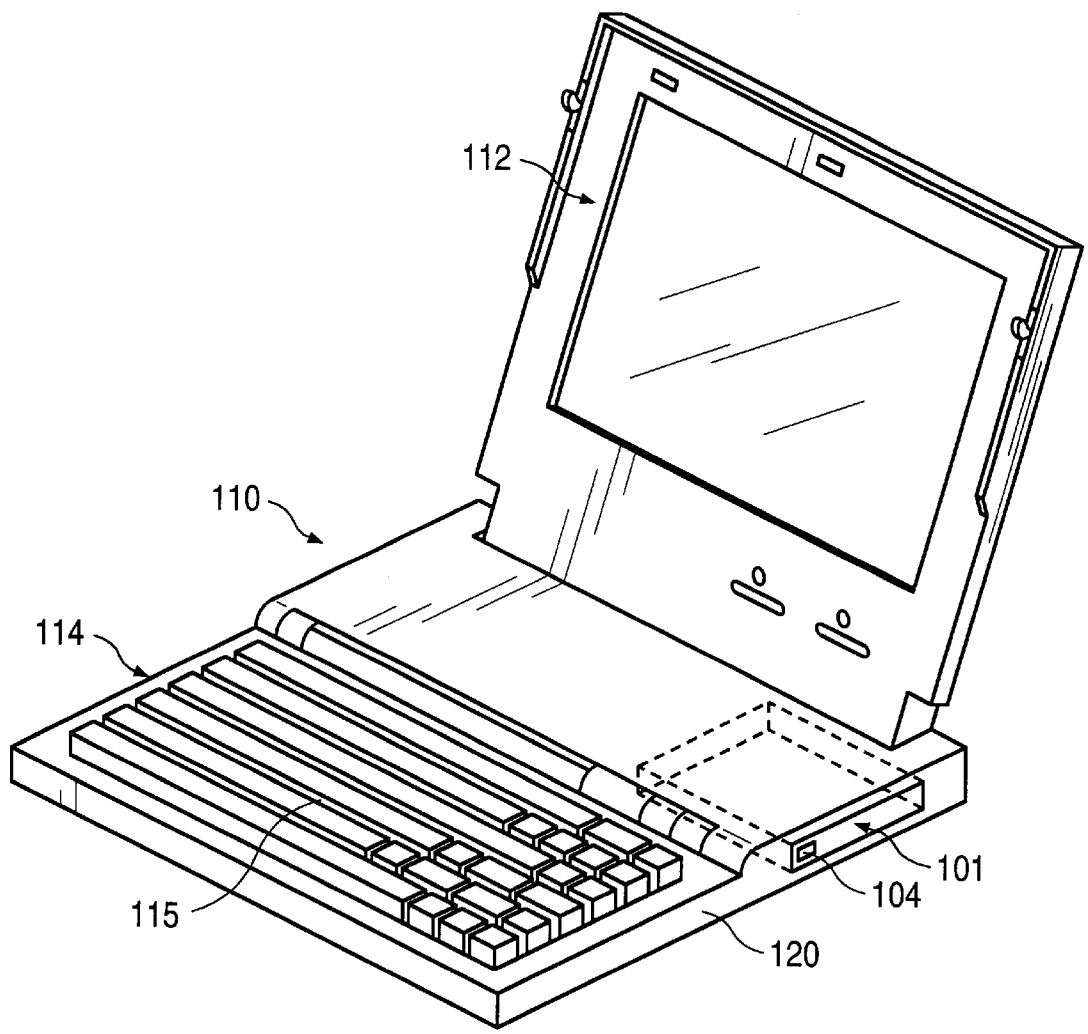
FIG. 1 is a perspective view of a computer system incorporating a media module locking and ejecting mechanism in accordance with an embodiment of the invention.

Referring to FIG. 1, a computer system 110 suitable for incorporating an embodiment of a media module locking and ejecting mechanism is shown. The computer system 110 is a portable computer which includes a lid portion 112 and a base portion 114. The base portion 114 includes a keyboard 115. The base portion also includes an outer side panel 120. The media module 101 is shown in a locked position in the media bay 201 of the computer system 110. The media bay is illustrated in outline form in FIG. 1 and illustrated in detail in FIG. 2.

In other embodiments, the media bay 201 may be located in other locations in the computer system. Although the embodiment shown in FIG. 1 shows that the media module 101 is flush with the outer side panel 120, in other embodiments a portion of the media module may be extending past the outer side panel 120 when in the locked position in the media bay 201. The eject button 104 is located on the outer side panel of media module 101. However, in other embodiments the eject button 104 may be located on the outer side panel 120.

Numerous varieties of the media module 101 include various peripheral devices enclosed within a protective housing. The peripheral devices are generally selected from device types including a CD ROM drive, a floppy disk drive, a hard disk drive, sound and video devices, a modem or specialized communication devices, speakers, an extra battery pack, or any peripheral, I/O or other device that is suitably used by the computer system. The media module 101 is sized to include at least one of the various peripheral devices while supplying a standard interface with the media bay 201. In the illustrative embodiment, the media module 101 is formed in the shape of a rectangular box. However, in other embodiments, the media module 101 may be structured in other forms or shapes.

Figure 2:
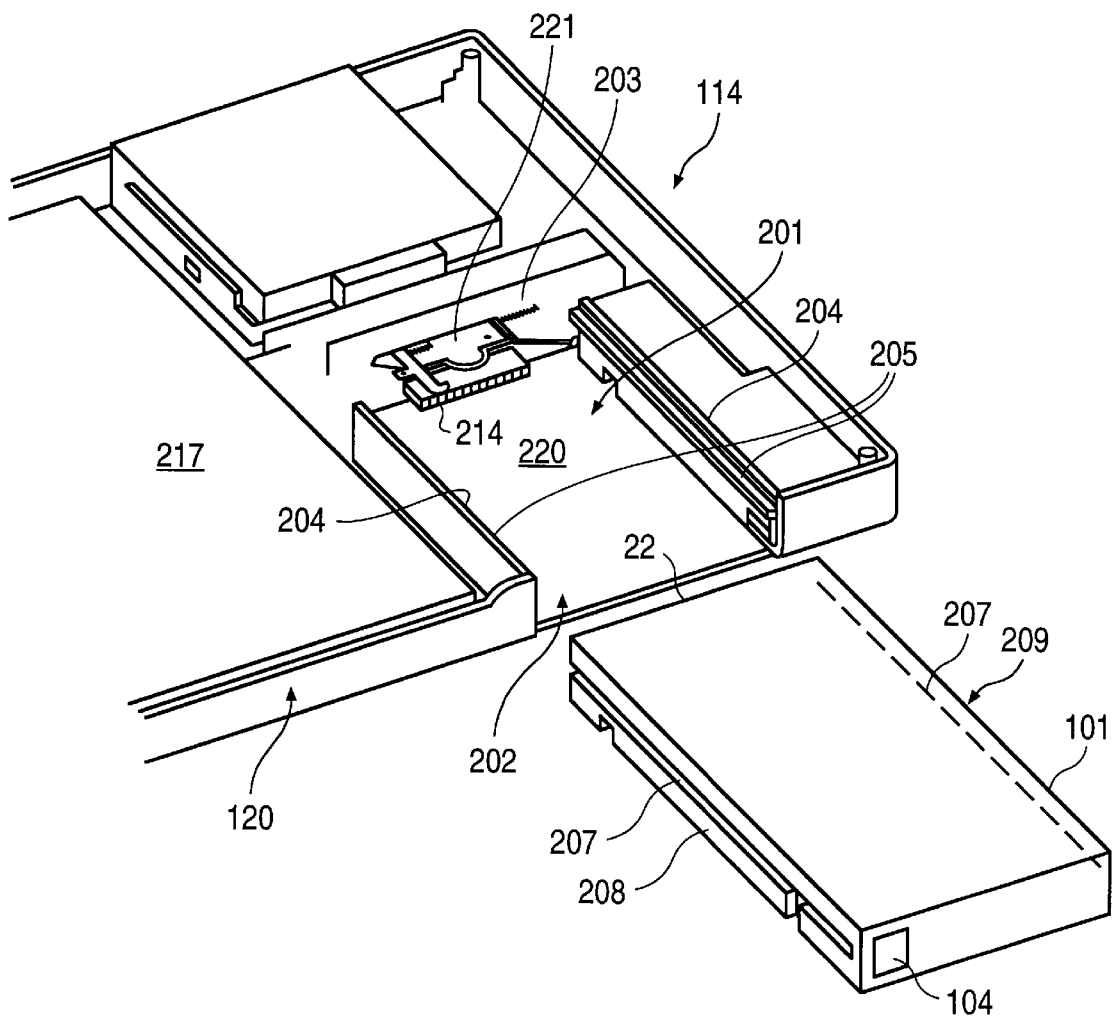
FIG. 2 is perspective view of the base portion of the computer system illustrating a media module locking and ejecting mechanism, a media module, and a media bay of the computer system shown in FIG. 1.

Referring to FIG. 2, a partial perspective view of the base portion 114 is shown. In the embodiment shown, guide rails 207 are located on sides 208 and 209 of media module 101. The media bay 201 is located within the base portion 114 and has an opening 202 in the outer side panel 120. The sidewalls 204 of media bay 201 have corresponding guide rails 205. Guide rails 205 and 207 are used to guide the media module 101 when it is inserted into the media bay 201. The media bay 201 has a back wall 203 and a base wall 220. The system board or mother board 217 of computer system 110 is also enclosed in the base portion and is located in a cavity adjacent to the media bay 201. In other embodiments, the system board may extend overlying or beneath the media bay 201.

The media module locking and ejecting mechanism 221 is located at the back of the media bay 201 against the back wall 203. A system board electrical connector 214 is attached to the back wall 203 of the media bay 201, and is electrically connected to the system board 217. An electrical connector 214 electrically connects the media module 101 to the system board 217. The illustrative electrical connector is a "D-shaped" connector. However, other types of connectors may be used in other embodiments. Other electrical connectors may be located on the back wall 203. These connectors may also connect the media module 101 to other devices in the computer system 110 such as a power supply (not shown).

Figure 3:
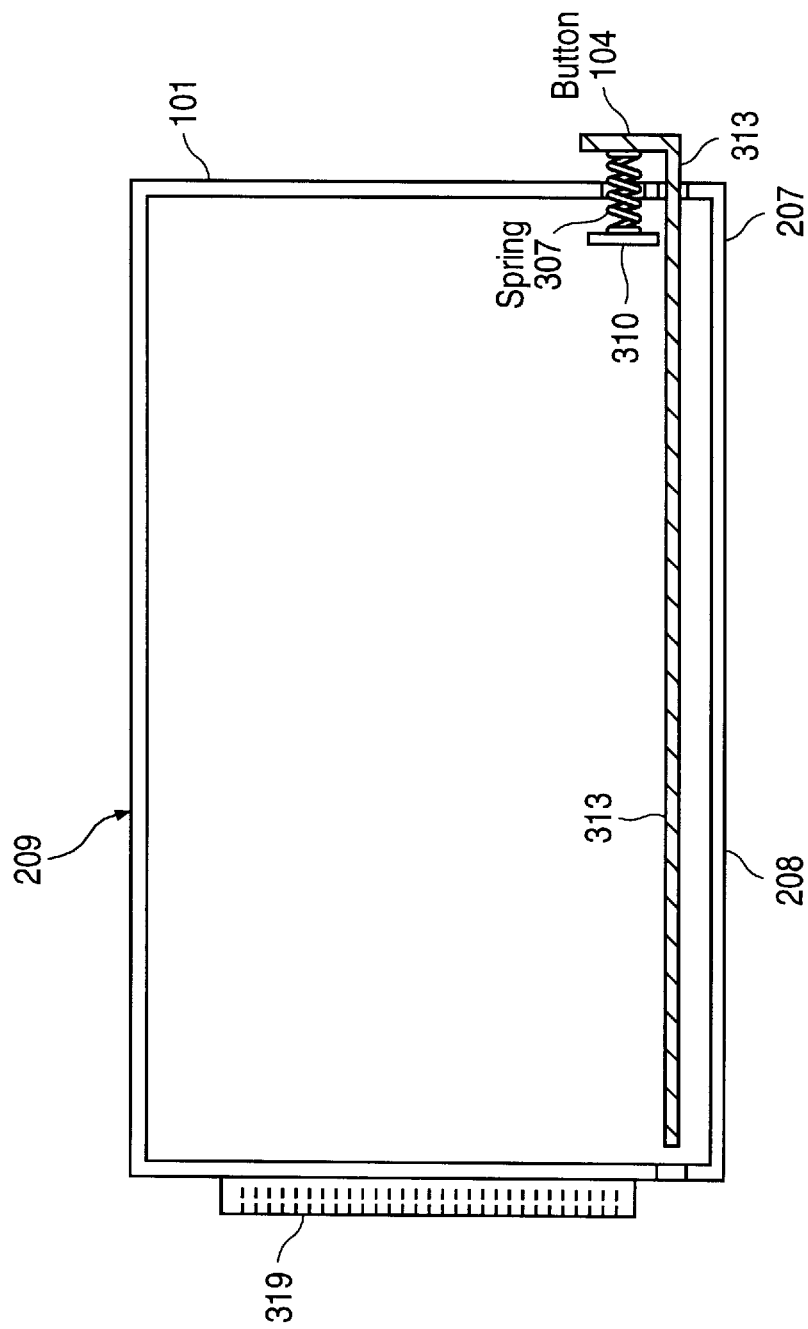
FIG. 3 is a top view of an embodiment of the media module shown in FIG. 1.

Referring to FIG. 3, The media module 101 also includes a push rod 313. In one embodiment, the push rod 313 is a sheet metal push rod. The eject button 104 is attached to the push rod 313. The eject button 104 includes a button spring 307 that provides a return force to the eject button 104 when the eject button 104 is pressed. Button spring 307 is attached on the other end to a surface 310 that is physically affixed to the media module 101 such that when the eject button 104 is pressed, the surface 310 remains in a fixed position relative to the media module 101. The media module 101 also includes a module electrical connector 319 for electrically connecting the media module to the electrical connector 214 which is electrically connected to the system board 217 of the computer system 110. The electrical connector 319 may also connect the media module to other devices in the computer system such as a power supply (not shown). In other embodiments, the media module may include a plurality of electrical connectors.

Figure 4:
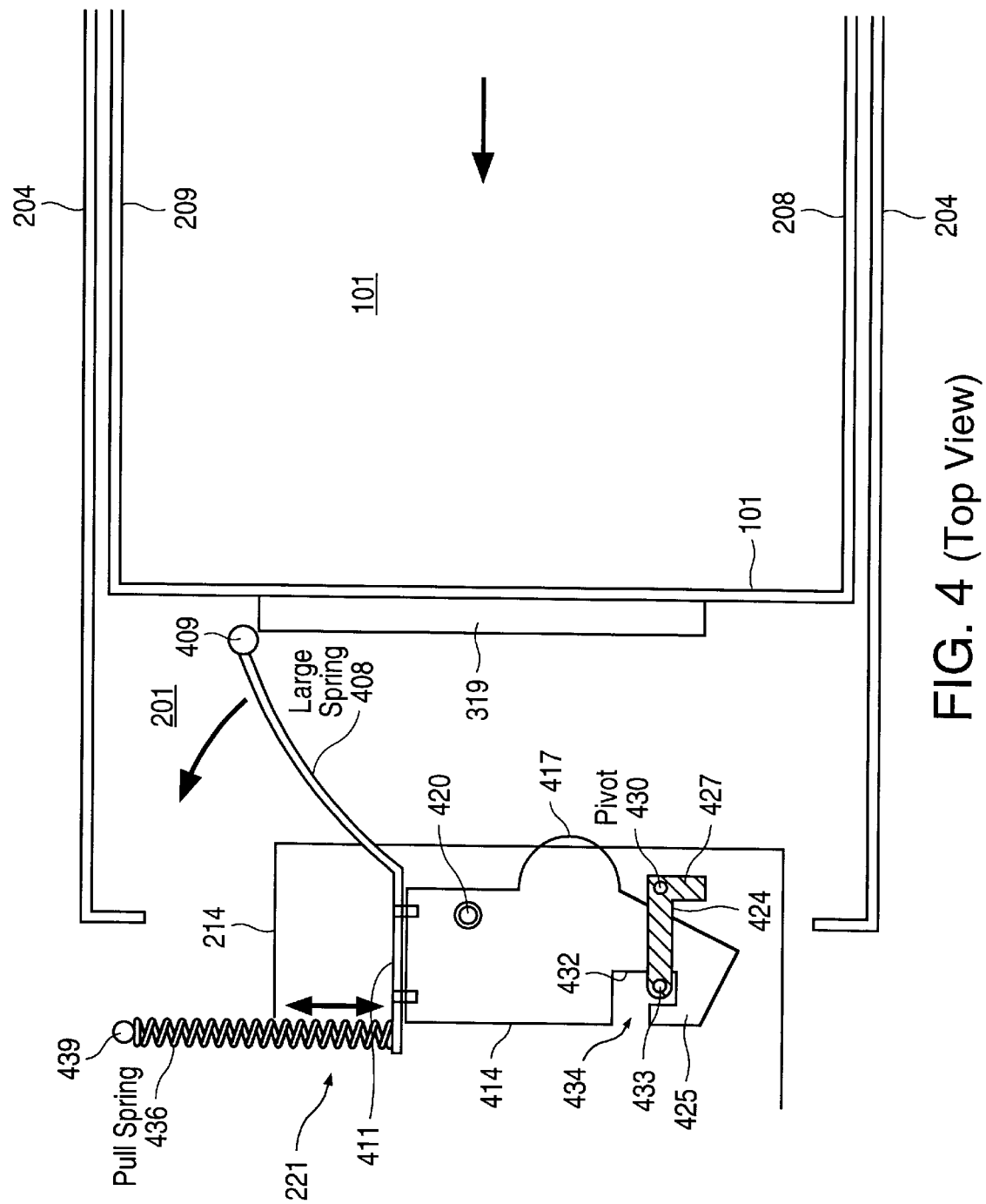
FIG. 4 is a top view of an embodiment of the media module locking and ejecting mechanism when the media module is positioned in a first intermediate position in the media bay.

FIG. 4 is a top view of the media module 101 when the media module 101 is positioned at a first intermediate position in the media bay 201. The locking and ejecting mechanism 221 is located above electrical connector 214. In other embodiments, the position of the electrical connector 214 with respect to the locking and ejecting mechanism 221 may vary. The locking and ejecting mechanism 221 includes a large spring 408 which is attached to a rotating body 414 with the use of spring attachments 411. In the illustrative embodiment, large spring 408 is a beam spring and is bent at an approximate 135 degree angle. In other embodiments, other types of springs may be used. Large spring 408 includes a smooth surface sliding knob 409 at the end of the spring. The rotating body is mounted on a pivot 420. The pivot 420 is physically affixed to the media bay 201 so that the pivot 420 remains fixed relative to the media bay 201 during the locking and ejecting operations. The rotating body 414 rotates around the pivot 420. The rotating body 414 includes a drive eject head 417 and a retaining portion 425. The rotating body 414 also includes a recess 434 which has a back wall 432.

A large spring locking device 424 is mounted on a pivot 430 allowing the large spring locking device 424 to rotate around pivot 430. Pivot 430 is physically affixed to the media bay 201 so that the pivot 430 remains fixed relative to the media bay 201 during the locking and ejecting operations. The large spring locking device 424 also includes a release arm 427 for providing a force to rotate the large spring locking device 424 around the pivot 430. A locking pin 433 is included on the large spring locking device 424. When the media module 101 is in the first intermediate position, the locking pin 433 resides in the recess 434 of the rotating body 414.

The large spring 408 is attached to a pull spring 436 which generates a force acting on the large spring 408. The force acts in an upward direction relative to the view illustrated in FIG. 4. In the illustrative embodiment, pull spring 436 is a coil spring. In alternative embodiments, other types of springs or other force generating mechanisms may also be used. The end of pull spring 436 opposite the large spring 408 is attached to an attachment point 439 which is physically affixed to the media bay 201 such that that attachment point 439 remains in a fixed position relative to the media bay 201 during the locking and ejecting operations. Because the large spring 408 is attached to the rotating body 414, the upward force on large spring 408 from pull spring 439 causes the rotating body 414 to rotate around pivot 420. In an alternative embodiment, pull spring 436 could be attached to the rotating body 414 instead of the large spring 408 and perform the same function.

Figure 5:
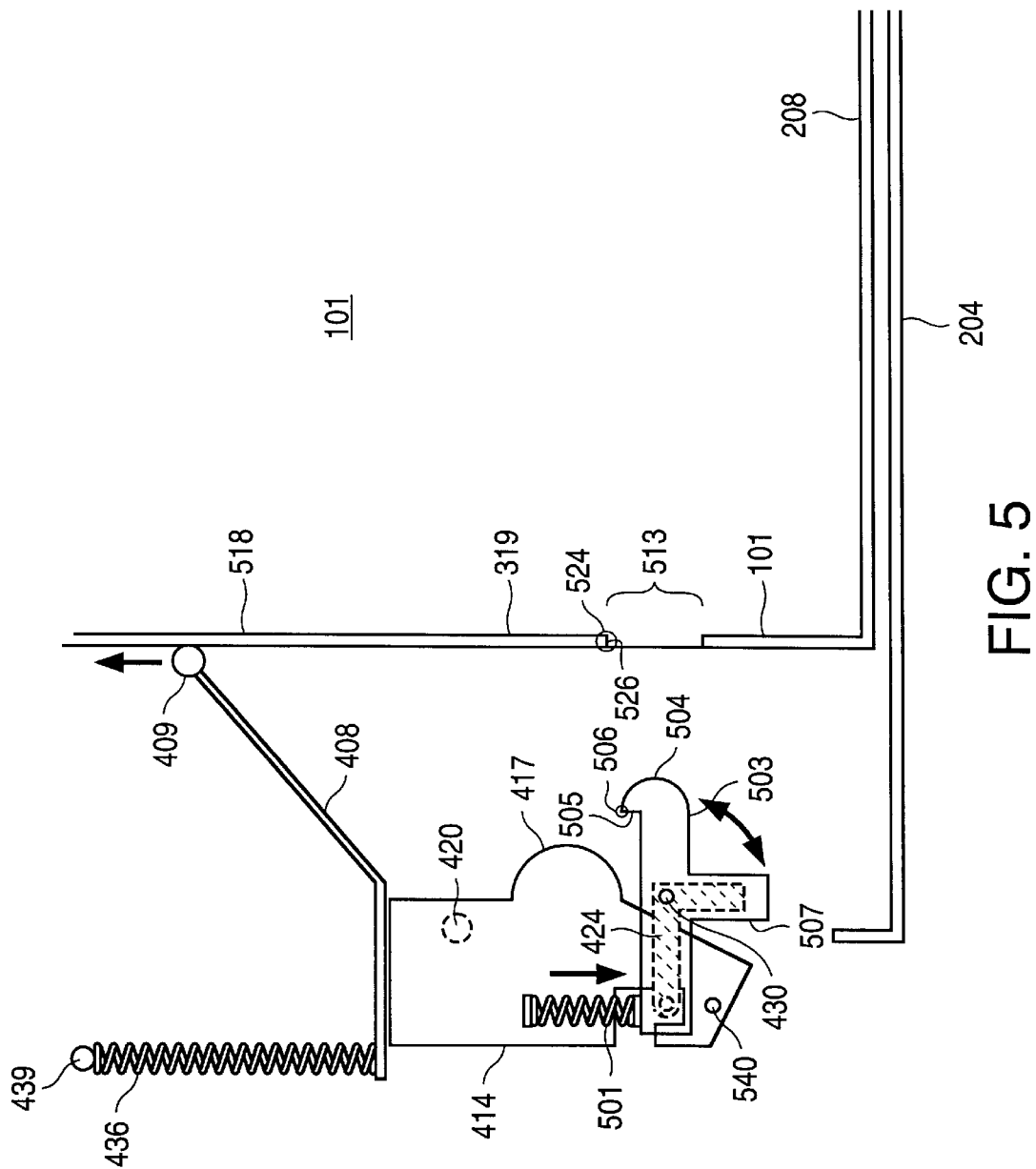
FIG. 5 is a top view of the media module locking and ejecting mechanism when the media module is positioned in a second intermediate position in the media bay.

Referring to FIG. 5, the media module 101 is shown positioned in a second intermediate position where the media module 101 is extended further within the media bay 201 in comparison to the first intermediate position. In FIG. 5, the electrical connectors 214 and 319 are not shown. In the second intermediate position, a back wall 518 of the media module 101 contacts the sliding knob 409 of the large spring 408. As the media module 101 is extended farther into the media bay 201, the sliding knob 409 moves further up the back wall 518 of the media module 101. In alternative embodiments, other devices such as a roller wheel or bearing perform the same function as the sliding knob 409.

A module locking device 503 is mounted on a pivot 430 allowing the locking device 503 to rotate around pivot 430. The module locking device 503 is located in the direction of the exterior of the media bay 201 with respect to the large spring locking device 424. Module locking device 503 includes a locking head 504 with a locking surface 505. The outer surface of the locking head 504 is smooth and curved. The module locking device 503 also includes a release arm 507 for providing a force lever to rotate the module locking device 503 around the pivot 430.

A return spring 501 is attached to the module locking device 503. The return spring 501 generates a force on the module locking device 503 which causes the module locking device 503 to rotate in a counter clockwise direction around pivot 430 in the view shown in FIG. 5. The end of return spring 501 that is attached to the module locking device 503 also engages to the large spring locking device 424 to generate a force on the large spring locking device 424 that causes the large spring locking device 424 to rotate in a counter clockwise direction around pivot 430 relative to the view shown in FIG. 5. The end of the return spring 501 opposite the module locking device 503 is attached to the rotating body 414. In another embodiment, the end of return spring 501 opposite the module locking device 503 is attached to an attachment point connected to the media bay 201 so that the attachment point remains fixed relative to the media bay 201 during the locking and ejecting operations.

A pivot stop 540 is physically affixed to the media bay 201 to hold the pivot stop in a fixed position relative to the media bay 201 during the locking and ejecting operations. In the first intermediate position, the force from return spring 501 pushes both the module locking device 503 and the large spring locking device 424 against pivot stop 540.

The media module 101 includes a space or notch 513 in the back wall 518. In the embodiment shown, space 513 is large enough for the locking head 504 to penetrate the back wall 518 of the media module 101. In other embodiments, the location of the locking head 504 with respect to media module may be varied so that the locking head 504 may not be required to penetrate the media module 101.

Figure 6:
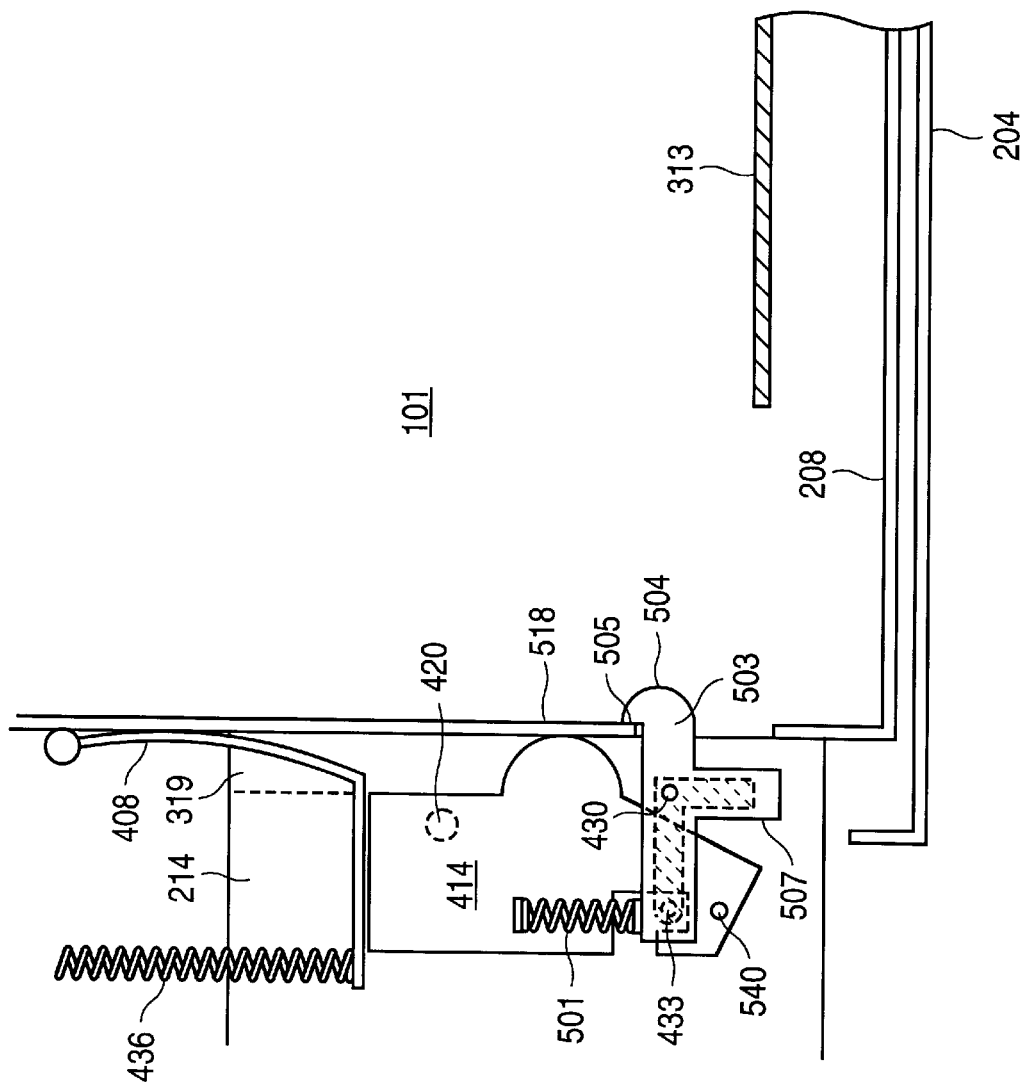
FIG. 6 is a top view of the media module locking and ejecting mechanism when the media module is positioned in a locked position in the media bay.

Referring to FIG. 6, the media module 101 is shown in the locked position with the locking head 504 extended through the space or notch 513 and the locking surface 505 of the locking head 504 locked against the inner surface of the back wall 518 of the media module 101 and the large spring 408 in tension against the back wall 518.

Figure 7:
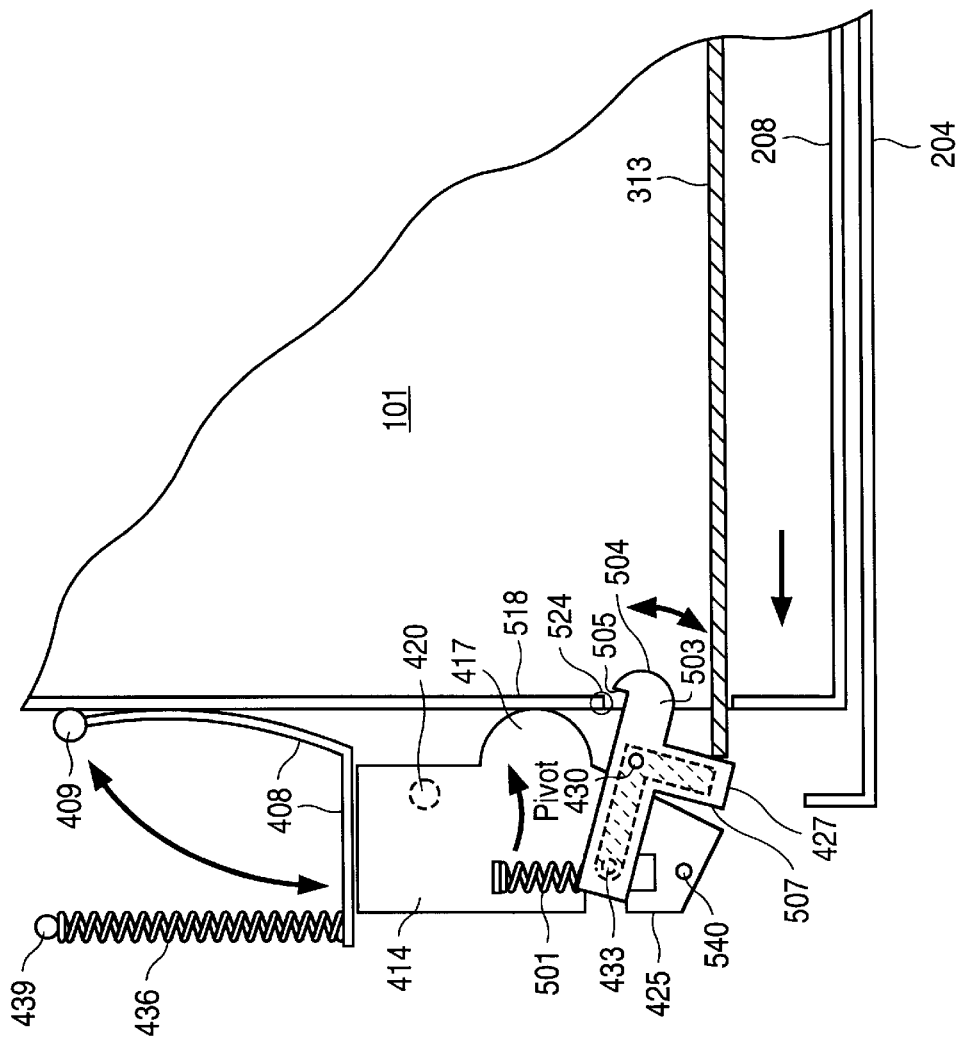
FIG. 7 is a top view of the media module locking and ejecting mechanism while the eject button is actuated.

Referring to FIG. 7, the media module 101 is shown in a position in which the eject button 104 is actuated, pushing the push rod 313. The push rod 313 engages the release arms 507 and 427 to detach the locking head 504 from the inner surface of the back wall 518 and initiate ejection of the media module 101.

Figure 8:
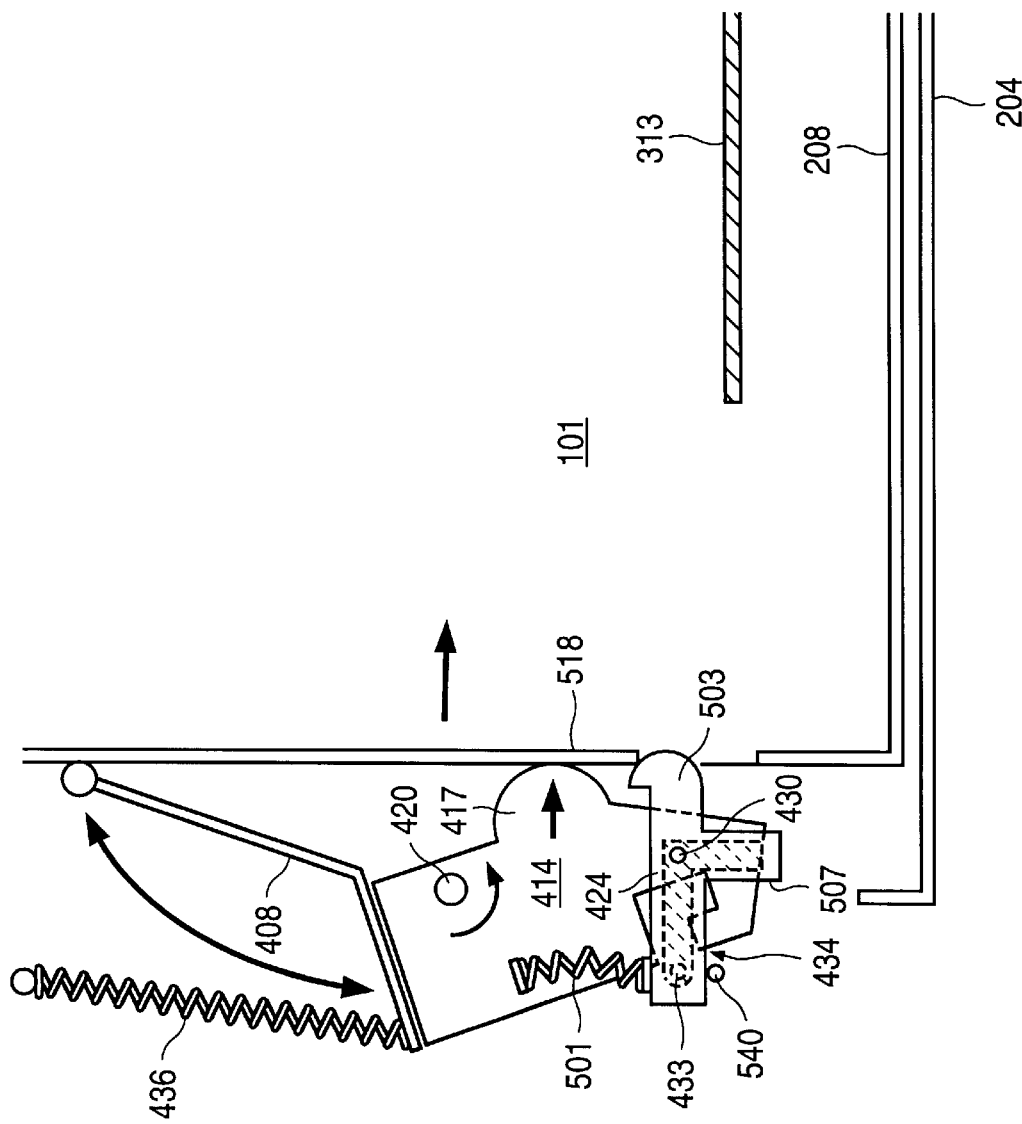
FIG. 8 is a top view of the media module locking and ejecting mechanism when the rotating body has moved the media module from the locked position.

Referring to FIG. 8, the media module 101 is shown in a position in which the locking head 504 has cleared the space or notch 513 occurring subsequent to the position illustrated in FIG. 7. The rotating body 414 ejects the media module 101 from the locked position, driven by the force of the large spring 408.

The insertion and locking operation of the locking and ejecting mechanism 221 is described as follows. Referring to FIG. 2, the media module 101 is inserted into the media bay 201 at the media bay opening 202. The guide rails 207 of the media module 101 are lined with the corresponding guide rails 205 attached to the walls 204 of the media bay 201. The media module 101 is pushed into the media bay 201 on the guide rails 207 and 205 to the first intermediate position, illustrated in FIG. 4.

The media module 101 is pushed further into the media bay 201 to the second intermediate position shown in FIG. 5. The back wall 518 of the media module 101 contacts the sliding knob 409 of large spring 408. The media module 101 is pushed further into the media bay 201 and the sliding knob 409 slides along the back wall 518 in a direction away from the rotating body 414, causing the large spring 408 to load to a state of tension. In the state of tension, the large spring 408 exerts a force on the rotating body 414, causing the rotating body 414 to rotate in a counter clockwise direction around pivot 420, relative to the view shown in FIG. 5. However, locking pin 433 generates a countering force against retaining portion 425 to prevent the rotating body 414 from rotating, or significantly rotating, in a counter clockwise position.

As the media module 101 is moved further into the media bay 201, the edge portion 524 of the back wall 518 of the media module 101 contacts the curved surface of the locking head 504 of the locking device 503. As the media module 101 extends further into the media bay 201, the curved surface of locking head 504 enables the edge portion 524 to push the head portion 504 in a direction that rotates the locking device 503 around pivot 430 in a clockwise direction relative to the view shown in FIG. 5. The force of the edge portion 524 pushing the head portion 504 counters the force from return spring 501 on the locking device 503. The force on the locking head 504 exerted by the edge portion 524 continues until the flat portion 526 of the edge portion 524 contacts a locking head point 506 of locking head 504. The locking head point 506 is a point at tip of the locking head 504 at which the curved surface meets the retaining surface 505. Further insertion of the media module 101 into the media bay 201 causes the locking head point 506 to slide along the flat portion 526 until the locking head point 506 meets the end of the flat portion 526 on the inner side of wall 518. Further insertion of the media module 101 into the media bay 201 causes the force of the return spring 501 to rotate the locking device 503 around pivot 430 in a counter clockwise direction, relative to the view as shown in FIG. 5, until locking device 503 rests against pivot stop 540. In an alternative embodiment, the locking device does not stop at the pivot stop 540, but rather the locking device 503 rests against the flat portion 526 of the edge portion 524. In this position, the media module 101 is in the locked position shown in FIG. 6.

As the media module 101 is moved toward the locked position during the insertion of media module 101 into media bay 201, the module electrical connector 319 engages the system board electrical connector 214. In the locked position, the module electrical connector 319 is securely and fully engaged in the system board electrical connector 214, electrically connecting the media module 101 to the system board 214. In the locked position, large spring 408 is in a loaded or tensed state in which the large spring 408 generates a force against the back wall 518 pushing the media module 101 away from the rotating body 414 andtoward the media bay opening 202. The locking device 503, and more specifically the retaining surface 505, generates a force against the inner side of the back wall 518 to counter the force from the large spring 408, preventing the media module 101 from being pushed towards the media bay opening 202.

Ejection of the media module locking and ejecting mechanism 221 is described as follows. Referring to FIG. 1, when a user elects to eject the media module 101 from the media bay 201, the user presses the eject button 104. Actuation of the eject button 104 forces the push rod 313 into the media module. The end of the push rod 313 contacts or engages the releasing arms 507 and 427, disengages the module locking device 503 from the media module 101, and releases the large spring locking pin 433. Referring to FIG. 7, the inward force of the push rod 313 on the release arms 507 and 427 causes the locking device 503 and the large spring locking device 424 to rotate in a clockwise direction around pivot 430, relative to the view shown on FIG. 7. The locking device 503 and the large spring locking device 424 are rotated in a clockwise direction if the force of the push rod 313 exceeds the counter rotational force generated by the return spring 501.

The rotation of the locking device 503 in a clockwise direction around pivot 430, relative to the view shown in FIG. 7, causes the locking head 504 to move away from the edge 524 of the back wall 518 to a position in which the, locking head 504 is completely free of the edge 524. When the locking head 504 clears the edge 524, the locking device 503, and more specifically the retaining surface, 505, no longer generates a force sufficient to counter the forces from the large spring 408 and the eject head 417. Forces from the large spring 408 and the eject head 417 push the media module 101 toward the opening 202 of the media bay 201, as is described hereinafter.

Rotation of the large spring locking device 424 in a clockwise direction, relative to the view shown on FIG. 7, causes the large spring locking pin 433 to move in an upward direction, relative to the view shown on FIG. 7, and to clear the retaining portion 425 of the rotating body 414. Once the locking pin 433 clears the retaining portion 425, the locking pin 433 no longer generates a force against the retaining portion 425 sufficient to prevent the rotating body 414 from rotating in a counter clockwise direction around pivot 420, relative to the view shown on FIG. 7. The force exerted by the large spring 408 upon release from the tensed position occurring when the media module 101 is in the locked position against the back wall 518 of media module 101 causes the rotating body 414 to rotate in a counter clockwise direction around pivot 420, relative to the view shown on FIG. 7.

The rotating body 414 has a drive eject head 417 with a protruding curved surface. The protruding curved surface is positioned on the drive eject head 417 on the rotating body 414 to force a portion of the drive eject head 417 into contact with the back wall 518 of the media module 101 during a counter clockwise rotation of the rotating body 414 around pivot 420, relative to the view shown on FIG. 7.

Referring to FIG. 8, the rotating body 414 rotates in the counter clockwise direction following release of the rotating body 414 from the position resulting when the media module 101 is in a locked position illustrate in FIG. 6. As the rotating body 414 rotates, the distance between the pivot 420 and the portion of the drive eject head 417 in contact with the back wall 518 increases. Similarly, the distance between the media module 101 and the pivot 420 increases. The force of the drive eject head 417 pushing against the media module 101 generates a force sufficient to unmate, deattach, or disconnect the module electrical connector 319 from the system board electrical connector 214. The force of the drive eject head 417 pushing against the media module 101 also generates a force sufficient to move the media module 101 away from the rotating body 414 to a position in the media bay 201 where a portion of the media module 101 extends out from the media bay 201 past the outer surface 120 of the base portion 114 of computer system 110. Once a portion of the media module 101 clears the media bay, a user can grasp the portion of the media module 101 extending past the outer surface 120 and fully remove the media module 101 from the media bay 201.

Referring again to FIG. 7, the rotating body 414 rotates in a counter clockwise direction around pivot 420 and the locking pin 433 clears the recess 434 so that the locking pin is outside the recess 434. Once push rod 313 no longer exerts a force on release arms 427 and 507, the return spring 501 rotates the large spring locking device 424 and locking device 503 in a counter clock wise direction until the large spring locking device 424 and locking device 503 are positioned at rest against the pivot stop 540.

The user moves the media module 101 away from the rotating body 414, decreasing the force generated by the large spring 408 against the rotating body 414 to a level at which the large spring 408 no longer generates a force against rotating body 414, when the large spring 408 is no longer in contact with the back wall 518 of the media module 101. As the force from large spring 408 against the rotating body 414 decreases, the force from return spring 436 rotates the rotating body 414 in a clockwise direction around pivot 420, relative to the view shown on FIG. 4. Rotation of the rotating body 414 in a clockwise direction due to the force from pull spring 436, causes the retaining portion 425 to contact locking pin 433, rotating the large spring 424 in a clockwise direction until the locking pin 433 clears the retaining portion 425 and enters the recess 434. Once the locking pin 433 clears the retaining portion 425, the return spring 501 forces the large spring locking device 424 to rotate in counter clockwise direction, relative to the view shown in FIG. 4, until the large spring locking device 424 rests against the pivot stop 540. The rotating body 414 continues to rotate in a clockwise direction from the force of spring 436 until the back wall 432 of recess 434 rests against the locking pin 433, the original unloaded position of the locking and ejecting mechanism 221. In the original unloaded position shown in FIG. 4, the locking and ejecting mechanism 221 is ready to receive another media module.

Figure 9:
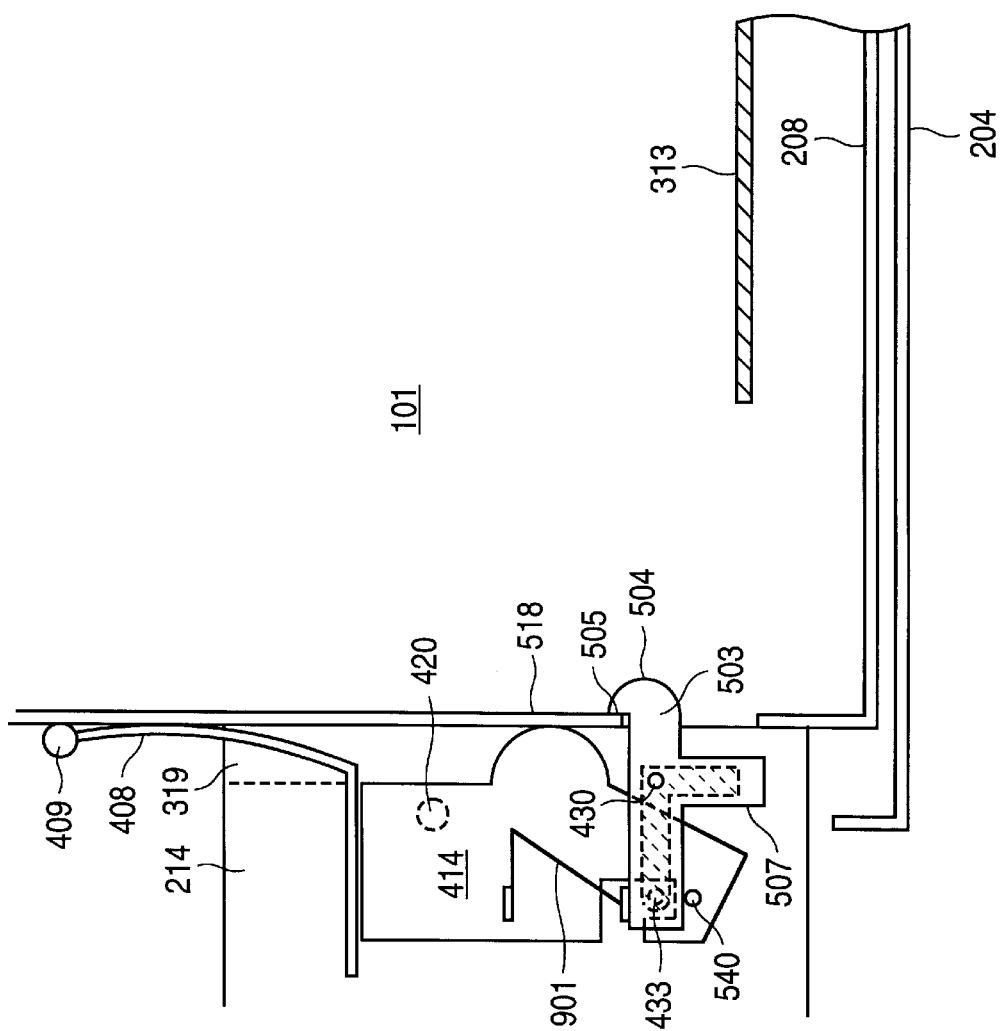
FIG. 9 is a top view of an alternative embodiment of the media module locking and ejecting mechanism. The use of the same reference symbols in different drawings indicates similar or identical items.

Referring to FIG. 9, an alternative embodiment of the media module locking and ejecting mechanism is shown. In the alternative embodiment springs 436 and 501 are replaced with a single beam spring 901 which generates a force against rotating body 414 and causes the rotating body 414 to rotate in a clockwise direction relative to the view shown in FIG. 9. The spring 901 also generates a force against large spring locking device 424 and locking device 503 causing the locking devices to rotate in a counter clockwise direction, relative to the view shown in FIG. 9. In other embodiments, other types of springs may be used for spring 901.

Providing a force by large spring 408 against both the rotating body 414 and the media module 101 is a way of ensuring that the force rotating the rotating body 414 to move the media module 101 ceases to exist when the media module is not in the media bay. This has the advantage of increasing the life of the force provider. In addition, if the force rotating the rotating body 414 to move the media module 101 does not exist when the media module 101 is not inserted in the media bay 201, then less force is required to return the rotating body 414 to its original position after moving the media module 101.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus for locking and ejecting a media module in a media bay comprising:
   a locking device engaging the media module to lock the media module in a locked position in the media bay, the locking device physically coupled to the media bay;
   a rod engaging the locking device to disengage the locking device from the media module;
   a rotating body mounted on a pivot, the pivot physically coupled to the media bay; and
   a first spring, the first spring physically coupled to the media bay, the first spring positioned to generate a force against the rotating body, the force against the rotating body rotating the rotating body on disengagement of the locking device from the media module, the rotation of the rotating body ejecting the media module from the locked position.

2. An apparatus according to claim 1 wherein the first spring is a beam spring.

3. An apparatus acceding to claim 1 wherein the locking device further includes:
   a release arm attached to the locking device, the rod engaging the release arm to disengage the locking device from the media module; and
   a first pivot physically coupled to the locking device and to the media bay, the locking device rotating on the first pivot upon engagement of the rod to the release arm.

4. An apparatus according to claim 1, wherein the media module includes a first electrical connector physically and electrically coupled to the media module, the apparatus further comprising:
   a second electrical connector physically coupled to the media bay, the second electrical connector being attached to the first electrical connector so that the media module is electrically coupled to the second connector when the media module is in the locked position.

5. An apparatus according to claim 4, wherein the rotation of the rotating body moving the media module from the locked position deattaches the first electrical connector from the second electrical connector.

6. An apparatus according to claim 1, wherein:
   the locking device includes a locking head; and
   as the media module is pushed to the locked position, a portion of the media module presses against the locking head forcing the locking head to move from a first position to second position so that the media module is further inserted into the media bay to the locked position.

7. An apparatus according to claim 6 further comprising:
   a second spring physically coupled to the locking device, the second spring returning the locking head to the first position to lock the media module after the media module is in the locked position.

8. An apparatus according to claim 7, wherein:
   the second spring is attached to the rotating body.

9. An apparatus according to claim 1, wherein:
   the first spring includes a sliding knob;
   during the insertion of the media module into the media bay, the media module passes a first position at which the media module contacts the sliding knob, the sliding knob sliding across a portion of the media module as the media module is further inserted past the first position to a locked position.

10. An apparatus according to claim 1 further comprising:
    a second locking device physically coupled to the media bay, the second locking device including a pin, the pin generating a force countering the first spring to prevent the rotating body from rotating during the insertion of the media module in the media bay, the rod engaging the second locking device to move the pin to rotate the rotating body.

11. An apparatus according to claim 1 further comprising:
    a second spring physically coupled to the rotating body and physically coupled to the media bay, the second spring rotating the rotating body to an original position after the media module is moved from the locked position.

12. An apparatus according to claim 1 where the rotating body further comprises:
    a head portion, the head portion having a surface at which a portion of the head portion contacts the media module during rotation of the rotating body when the locking device is disengaged, the head portion positioned on the rotating body to move the media module during the rotation of the rotating mechanism.

13. An apparatus according to claim 1 further comprising:
    a button, located on an outer portion of the media module and coupled to the rod, the button for actuation from a first position to a second position causing the rod to engage the locking device;
    a spring, coupled to the button and coupled to the media module, the spring returning the button from the second position to the first position.

14. An apparatus according to claim 1 wherein:
    the first spring generating a force against the media module.

15. An apparatus according to claim 1 wherein the first spring is physically coupled to the media bay via the first spring being attached to the rotating body, the rotating body being mounted on the pivot, and the pivot physically coupled to the media bay.

16. A method for manipulating a media module in a media bay of a computer system comprising the steps of:
    disengaging a locking device physically coupled to the media bay from the media module;
    generating a first force by a first spring;
    applying the first force against a rotating body mounted on a pivot, the pivot physically coupled to the media bay, the first force causing the rotating body to rotate when the locking device is disengaged from the media module, the rotating body rotating against the media module causing the media module to move in the media bay.

17. A method according to claim 16 wherein the step of disengaging the locking device further includes the steps of:
engaging a release arm attached to the locking device with a rod causing the locking device to rotate on a pivot to disengage the locking device from the media module.

18. A method according to claim 17 wherein the step of disengaging the locking device includes the step of:
actuating a button physically coupled to the rod, actuation of the button causing the rod to disengage the locking device from the media module.

19. A method according to claim 16 further comprising the step of:
disconnecting an electrical connector physically and electrically coupled to the media module from an electrical connector physically coupled to the media bay.

20. A method according to claim 16 further comprising the steps of:
generating a second force;
applying the second force to the rotating body; and
rotating the rotating body back in the opposite direction after the rotating body has moved the media module.

21. A method according to claim 16 farther comprising the steps of:
grasping a portion of the media module after the media module is moved in the media bay by the rotating body; and
removing the media module from the media bay.

22. A method according to claim 17 wherein:
the step of applying the first force further includes applying the generated force against the media module.

23. A method according to claim 22 wherein:
the first force is generated opposing the media module in a first direction;
the first force is generated opposing the rotating body in a second direction; and
the first and second directions are neither the same direction nor opposite directions.

24. A method according to claim 23, wherein the first direction and the second direction are generally perpendicular to each other.

25. A method according to claim 16 further comprising the steps of:
locking the media module in the media bay, the locking steps including:
inserting the media module in the media bay;
pushing the media module into the media bay to a position where a portion of the media module contacts a locking head attached to the locking device, the locking head taking a first position;
pushing the media module further into the media bay where the portion of the media module forces the locking head to a second position;
pushing the media module into a locked position; and
returning the locking device to the first position after the media module is in the locked position.

26. A method according to claim 16 further comprising the steps of generating a second force against the rotating body to counter the first force; and releasing the second force so that the first force causes the rotating body to rotate.

27. A method according to claim 26 wherein:
a pin attached to an arm generates the second force, the releasing step further including the steps of:
engaging a release arm with a rod, causing an arm to rotate so as to release the force from the pin against the rotating body.

28. A method according to claim 17 wherein:
the step of applying the first force further includes applying the generated force against the media module.

29. A computer system comprising:
a processor;
a media bay, the media bay receiving a media module, the media module including a first electrical connector physically and electrically coupled to the media module;
a second electrical connector physically coupled to the media bay and electrically coupled to the processor, when the media module is in the locked position, the first electrical connector is attached to the second electrical connector so that the media module is electrically coupled to the processor;
a locking device physically coupled to the media bay, the locking device engaging the media module to lock the media module in a locked position in the media bay;
a rod engaging the locking device to disengage the locking device from the media module;
a rotating body mounted on a pivot, the pivot physically coupled to the media bay; and
a first spring, the first spring physically coupled to the media bay, the first spring positioned to generate a force against the rotating body, the force against the rotating body rotates the rotating body on disengagement of the locking device from the media module, the rotation of the rotating body ejecting the media module from the locked position.

30. A computer system according to claim 29 wherein:
the computer system is a portable computer;
the media bay is located in the base portion of the portable computer.

31. A computer system according to claim 29 wherein the first spring is a beam spring.

32. A computer system according to claim 29 wherein the locking device further includes:
a release arm attached to the locking device, the rod engaging the release arm to disengage the locking device from the media module; and
a first pivot physically coupled to the locking device and to the media bay, the locking device rotating on the first pivot upon engagement of the rod to the release arm.

33. A computer system according to claim 29, wherein the rotation of the rotating body moving the media module from the locked position deattaches the first electrical connector from the second electrical connector.

34. A computer system according to claim 29, wherein:
the locking device includes a locking head; and
as the media module is pushed to the locked position, a portion of the media module presses against the locking head forcing the locking head to move from a first position to second position so that the media module is further inserted into the media bay to the locked position.

35. A computer system according to claim 34 further comprising:
a second spring physically coupled to the locking device, the second spring returning the locking head to the first position to lock the media module after the media module is in the locked position.

36. A computer system according to claim 35 wherein:
the second spring is attached to the rotating body.

37. A computer system according to claim 29 wherein:

the first spring includes a sliding knob;

during the insertion of the media module into the media bay, the media module passes a first position at which the media module contacts the sliding knob, the sliding knob sliding across a portion of the media module as the media module is further inserted past the first position to a locked position.

38. A computer system according to claim 29 further comprising:

a second locking device physically coupled to the media bay, the second locking device including a pin, the pin generating a force countering the first spring to prevent the rotating body from rotating during the insertion of the media module in the media bay, the rod engaging the second locking device to move the pin to rotate the rotating body.

39. A computer system according to claim 29 further comprising:

a second spring physically coupled to the rotating body and physically coupled to the media bay, the second spring rotating the rotating body to an original position after the media module is moved from the locked position.

40. A computer system according to claim 29 where the rotating body further comprises:

a head portion, the head portion having a surface at which a portion of the head portion contacts the media module during rotation of the rotating body when the locking device is disengaged, the head portion positioned on the rotating body to move the media module during the rotation of the rotating mechanism.

41. A computer system according to claim 29 further comprising:

a button, located on an outer portion of the media module and coupled to the rod, the button for actuation from a first position to a second position causing the rod to engage the locking device;

a spring, coupled to the button and coupled to the media module, the spring returning the button from the second position to the first position.

42. A computer system according to claim 29 wherein:

the first spring generating a force against the media module.

43. A computer system according to claim 29 wherein the first spring is physically coupled to the media bay via the first spring being attached to the rotating body, the rotating body being mounted on the pivot, and the pivot physically coupled to the media bay.

* * * * *